Patented Feb. 23, 1954

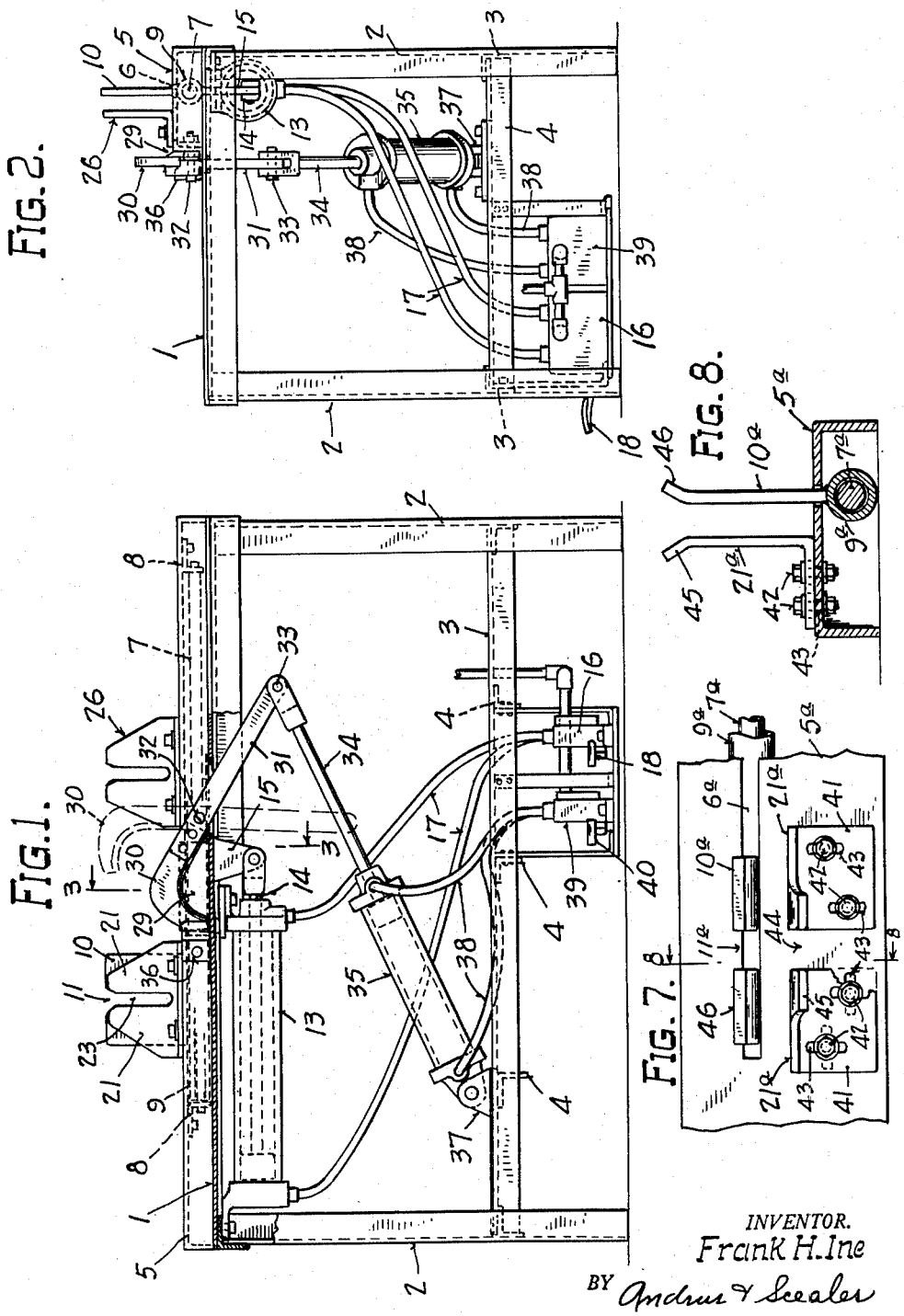

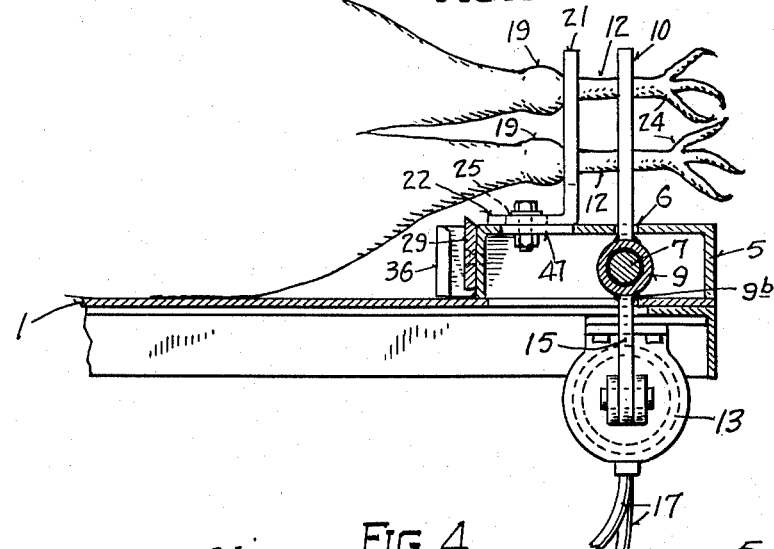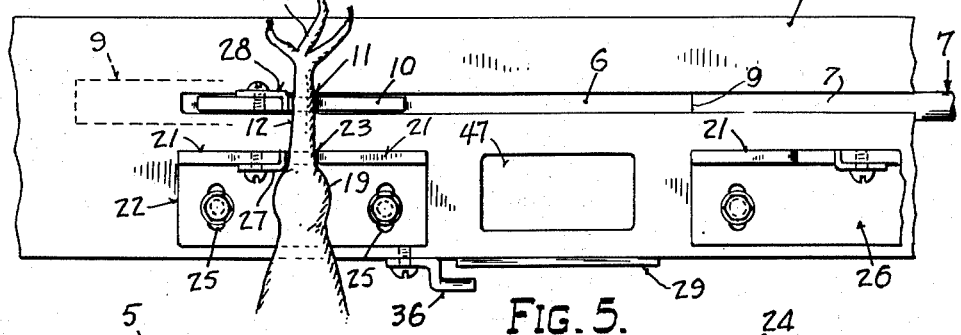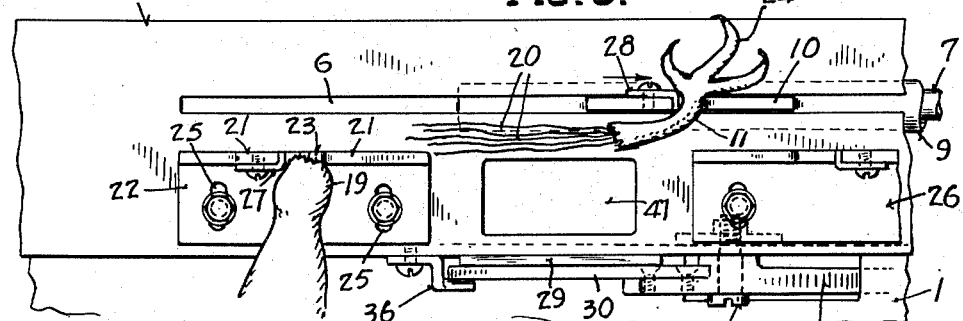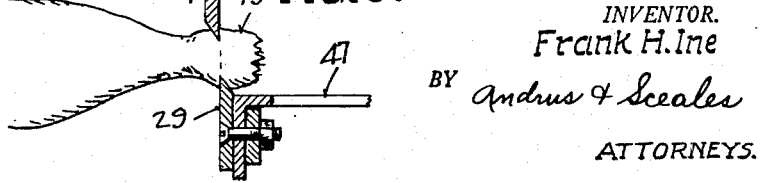

2,669,748

UNITED STATES PATENT OFFICE 2,669,748

FOWL TENDON PULLING MACHINE

Frank H. Ine, Milwaukee, Wis.

Application October 5, 1951, Serial No. 249,829

3 Claims. (Cl. 17—11.3)

This invention relates to a fowl preparation machine and particularly relates to a tendon puller and hock cutter apparatus employed in the preparation of turkeys or other fowl for market.

In order to make fowl, such as turkey, more suitable for carving and edibility, it has been found advisable to remove the tendons from the legs of the fowl. It is customary practice to cut off the legs of the fowl at the hock joint. However, if this is done, the tendons remain in the legs above the hock joint and are difficult, if not almost impossible, to remove. The present invention is therefore directed to an apparatus wherein both legs of the fowl to be prepared are first broken below the hock. The broken legs are then moved away from the hock joint, and the tendons are pulled from the leg below and above the hock joint. Thereafter, the legs are cut at the hock joint in the machine to complete preparation of the legs of the fowl.

One object of the invention is to provide a combination tendon puller and hock cutter wherein removal of the tendons and cutting of the hock can be accomplished in a relatively simple coordinated operation.

A further object is to provide a machine wherein the tendons are pulled from the legs of a fowl above the hock joint.

Another object is to provide a machine which is adjustable to remove tendons and cut hocks of birds of different sizes and lengths of legs.

Other objects of the invention will appear hereinafter in connection with the following description of an embodiment of the invention, as illustrated in the accompanying drawings.

In the drawings:

Figure 1 is a front elevation of the machine of the invention;

Fig. 2 is an elevation from the right side of the machine of Figure 1;

Fig. 3 is an enlarged detail sectional view taken on line 3—3 of Figure 1 with the legs of a fowl located in the machine;

Fig. 4 is an enlarged top plan view showing the legs of a fowl in place ready to have the legs broken and the tendons removed and illustrating the adjustability of the machine;

Fig. 5 is a top plan view similar to Fig. 4, but after the legs have been broken and the tendons removed;

Fig. 6 is a detail view showing cutting of the legs of a fowl at the hock joint;

Fig. 7 is a top plan view of another embodiment of the invention; and

Fig. 8 is a section taken on line 8—8 of Fig. 7.

Referring to the drawings, there is illustrated a machine comprising a flanged table or top 1 supported from the floor at each corner by flanged legs 2 and which are braced by flanged frame member 3 extending between the legs. Cross braces 4 are interposed between the longitudinal frame braces to support some of the equipment necessary to operate the machine.

The rear portion of top 1 comprises a raised channel member 5 which is provided with a longitudinal slot 6 in the central portion thereof. Directly beneath slot 6 and spaced therefrom is a bar 7 which is secured at each end by brackets 8 to the bottom of channel 5. Bar 7 supports thereon a tube 9 which is freely movable longitudinally of the bar.

At the left side of bar 7, as seen in Fig. 1, the puller 10 of the apparatus is welded to tube 9 and extends upwardly therefrom through slot 6 and for a substantial distance above channel 5 (see Fig. 3). Puller 10 is a flat plate which extends along slot 6 and has a central slot 11 therein with a tapered mouth and of a dimension to receive the legs 12 of the fowl, as will be described. Puller 10 is moved by tube 9 from one side to the other of the longitudinal slot 6 in channel 5.

The longitudinal movement of tube 9 is accomplished by operation of the cylinder 13 and piston 14. Cylinder 13 extends longitudinally beneath channel 5 at the left side of the table, as seen in Figure 1, while tube 9 and bar 7 are shown as located within channel 5. Cylinder 13 is suitably secured at the left side to the crossflanged brace of table top 1 and at the right side to the rear longitudinal brace of top 1. Piston 14 extends from the right side of cylinder 13 and is connected to tube 9 by a bracket 15, which is secured to the end of the piston and welded as at 9b to tube 9. Consequently, any movement of piston 14 results in longitudinal movement of tube 9 and the puller 10. Cylinder 13 is preferably double acting and is connected at each end to the actuating valve 16 by air hoses 17. Valve 16 communicates with a source of air, not shown, and is actuated by the foot pedal 18 to move piston 14 in one direction or the other. By providing the double-acting cylinder 13, it is possible to accomplish the breaking and consequent tendon removal operation by movement of puller 10 in either direction within slot 6.

Legs 12 of the fowl must be held at the hock joint 19 in order that puller 10 can break the legs and pull out the tendons 20. The holding of the legs is accomplished by upright members or breakers 21. The breakers 21 may be provided from a single plate, as shown, the bottom edge of which is welded to a flat plate 22 and which has a central slot 23 corresponding in dimensions to that of the cross-section of the legs of the largest fowl to be prepared. Slot 23 also corresponds to the dimensions of slot 11 in puller 10. The slot between breakers 21, however, is less than the cross-section of the hock joint of the fowl, so that the hock 19 of the fowl will not move through the space, but will engage breakers 21 to hold the fowl against the force of puller 10, as it moves longitudinally to break the legs of the fowl and pull out the tendons.

Fig. 3 illustrates the legs of a fowl disposed in the puller slot and between the breakers 21 preparatory to movement of the puller to break the legs of the fowl. The claws 24 of the fowl are initially slightly removed from the puller 10. In operation of the device, however, as the puller moves, the legs of the fowl are first broken and the slack is then taken up between the puller and claws and the tendons are pulled out as the hock joint of the leg is held against breakers 21, and the claws are held by puller 10.

Plate 22, on which breakers 21 are secured, is bolted to channel 5 adjacent the left side of the puller slot 6 but outwardly removed of the slot to space the breakers 21 from puller 10. However, bolt holes 25 in plate 22 are elongated so that plate 22, and consequently breakers 21, can be adjusted inwardly or outwardly as respects puller 10 to handle birds with different thickness and length of legs.

The description of the breakers has been made with reference to the breakers shown at the left side of the machine in Figure 1. However, a second set of breakers, generally designated with the numeral 20, is located at the right side of the machine, and the description is also applicable to them. By having a set of breakers 21 at each side of puller slot 6, puller 10 does not need to be returned to its starting position, but can break and pull from each side of the machine through operation of the double-acting cylinder 13, which has been described. This results in the saving of air as the piston does not need to be returned to starting position. The second set of breakers can, of course, be eliminated or not used if the demands of the installation only require one set of breakers.

Fig. 4 shows the legs of a fowl located in place preparatory to the breaking and tendon removal operation. Fig. 5 illustrates the legs as broken and the tendons being pulled from the upper legs. Figs. 4 and 5 also illustrate the adjustability of the apparatus.

Thus, as seen in Fig. 4, a flanged spacer plate 27 is bolted to the left breaker 21 with the flange of plate 27 being disposed in the space between breakers 21 to decrease the cross-section of the space to handle birds with smaller legs. A similar spacer plate can, of course, also be applied to the right breaker 21 and to either of the breakers shown at the right side of the machine. A flanged spacer plate 28 is also shown as bolted to puller 10 with the flange of the plate disposed in vertical slot 11 to decrease the cross-section of the slot. The spacer plates described are employed when birds with smaller legs are to be prepared.

The use of the machine described is further improved by locating a cutting device between the spaced breaker units so that after the legs of the fowl have been broken and the tendons removed, the legs of the bird can be cut at the hock joint in the same machine and by the same operator.

The cutting device comprises a stationary blade 29 and a movable blade 30.

Blade 29 is secured to the front side of channel 5 of table top 1, midway between the two sets of breakers 21. Blade 29 is curved, and the uppermost part of the blade is substantially flush with the upper surface of channel 5.

Movable blade 30 is recessed complementary to blade 29 and is received within handle 31, to which it is bolted, so that it can be readily replaced or removed for sharpening. Handle 31 is pivoted to the front side of channel 5 by bolt 32 and extends through a slot in table top 1 and is pivoted, as at 33, to piston 34 of the hydraulic cylinder 35. Blade 30 is guided against blade 29 by the retainer 36 which is secured to channel 5.

Cylinder 35 is pivoted at its lower end to a bracket 37, which is secured to one of the cross-braces 4.

Cylinder 35 is double-acting and is connected by air hoses 38 to valve 39, which is connected to a source of air, not shown. Actuation of the valve 39 to let air into one or the other side of cylinder 35 to move piston 34 is accomplished by foot pedal 40. A safety feature of the operation is that blade 30 is always in the down or cutting position when the foot valve is released. This position of blade 30 is illustrated in full lines in Figure 1. The upward position of blade 30 is illustrated in dotted lines in Figure 1.

Figs. 7 and 8 illustrate other ways in which parts of the breakers and puller portion of the machine may be constructed.

In Fig. 7 there is shown two separate plates 41 from which upwardly extend the breakers 21a. Both of the plates 41 are adjustable axially with respect to the puller 10a shown in Fig. 7 by means of elongated bolt holes in which bolts 42 are located to secure plates 41 to channel 5a. Also one of the plates 41, such as for example the left plate, is secured to channel 5a by its bolts 42 which extend through longitudinally elongated bolt holes 43 so that left plate 41 can be adjusted with respect to the right plate 41 to increase or decrease the space or slot 44 between the breakers to handle the legs of fowl of various size. The puller 10a would employ the spacer element 28, not shown, as described previously herein.

Figs. 7 and 8 also illustrate breakers 21a and puller 10a with the upper portion 45 of the breakers curved slightly toward the fowl and the upper portion 46 of the puller curved away from the fowl. It has been found that with this construction the curved portions of the breakers and puller tends to prevent the fowl from slipping out of these members as the legs are broken and the tendons pulled out.

In the operation of the apparatus, the legs 12 of a fowl, such as a turkey, are laid crosswise of the table between the breakers 21 at the left side of the table and in the slot 11 of puller 10, which is aligned with the space between breakers 21. The turkey in this position is held by the operator, so that the legs of the bird lie one on top of the other. The hocks 19 of the bird are held against the breakers 21. The operator then steps on foot pedal 18, and puller 10 is immediately pushed to the right within slot 6 by the piston and tube, as described. This results first in breaking the legs of the fowl and then in taking up of the legs between the puller and claws and pulling of the tendons 20 from the legs, as shown in Fig. 5, as the legs are held by the hock and claws. The operator thereafter releases the foot pedal 18, but puller 10 remains at the right side of puller slot 6. The operator then disposes of the legs and tendons and thereafter lays the hock joints 19 of the bird across the stationary blade 29, after first stepping on foot pedal 40 to raise cutting blade 30. When the hock joint is in place, foot pedal 40 is released and blade 30 descends to sever the hock joints and give the bird a clean appearance at the end of the stubs of the legs. The severed portions of the legs fall down through rectangular slot 47 in channel member 5.

The operator then takes a second bird and lays its legs in the breakers 21 and puller 10 at the right side of the machine. Upon stepping on foot pedal 18, puller 10 is now moved to the left side of the machine to break the legs of the second turkey and pull out the tendons. The operator then cuts off the legs of the fowl with the blades 29 and 30 at the center of the machine in the same manner as described with respect to the first turkey.

The invention provides a machine whereby a single operator can remove tendons and cut the legs of a turkey or other fowl in a few simple and compact operations. By providing a machine which removes tendons by pulling them from place, the tendons are removed substantially in total, and the removal of the tendons is accomplished by a simple operation. Another advantage is that both legs of the fowl are broken and the tendons removed therefrom at the same time in a single operation.

Various embodiments of the invention may be employed within the scope of the following claims.

I claim:

1. In a fowl preparation machine, a support, a puller member secured to said support and movable reciprocally from a first position to a second position, means on said puller member holding the legs of a fowl in engagement with said puller member, first upright breaker means secured to said support adjacent said first position and having a slot therebetween for alignment with the means on the puller member when the latter is at said first position to receive the legs of a fowl in said slot and with the legs disposed in engagement with the means on the puller member, a second breaker means secured to the support adjacent said second position and having a slot therebetween for alignment with the means on the puller member when the latter is at said second position to receive the legs of a fowl in said slot and with the legs disposed in engagement with the means on the puller member, and double acting single means to drive the puller member reciprocally of the support in either direction and laterally away from either said first or second breaker means to break the legs of a fowl and pull out the tendons as the puller member moves away from a respective breaker means.

2. In a fowl preparation machine, a support having a longitudinal slot therein, a bar secured to the support beneath said slot, a tube freely movable on said bar, a movable flat plate secured to the tube and extending upwardly of the support through the slot in the support, said plate having a central vertical slot of a dimension to receive the legs of a fowl disposed one above the other, a stationary flat plate secured to the face of said support along side of the longitudinal slot in the support with upright means extending upwardly therefrom and having a vertical slot therein in alignment with the slot in the movable plate to receive the legs of a fowl laid one above the other in said upright means and the slot in the movable plate, and a hydraulic cylinder secured to said support and having the piston thereof connected to said tube to drive the tube and movable plate longitudinally of the support with the movable plate moving laterally past the stationary plate, said movement of the movable plate effecting breaking of the legs of the fowl and removal of the tendons as the legs are held in the slots of the movable plate and upright means by the claws and hock joints of the fowl.

3. In a fowl preparation machine, a support having a longitudinal slot therein, a bar secured to the support beneath said slot, a tube freely movable on said bar, a movable flat plate secured to the tube and extending upwardly of the support through the slot in the support, said plate having a central vertical slot of a dimension to receive the legs of a fowl disposed one above the other, a stationary flat plate bolted to the face of said support along side of the longitudinal slot in the support and having elongated bolt holes to adjust the plate laterally with respect to the movable plate, a flat upright plate secured to the stationary plate and having a vertical slot therein in alignment with the slot in the movable plate to receive the legs of a fowl laid one above the other as the legs are disposed crosswise of the support within the slots in the movable and upright plates, and a hydraulic cylinder secured to said support and having the piston thereof connected to said tube to drive the tube and movable plate longitudinally of the support with the movable plate moving laterally past the stationary plate, said movement of the movable plate effecting breaking of the legs of the fowl and removal of the tendons as the legs are held in the slots of the movable plate and upright means by the claws and hock joints of the fowl.

FRANK H. INE.

References Cited in the file of this patent

UNITED STATES PATENTS

| Number | Name | Date |
| --- | --- | --- |
| 706,853 | Scannell | Aug. 12, 1902 |
| 787,025 | Congdon | Apr. 11, 1905 |
| 2,278,162 | Courlang et al. | Mar. 31, 1942 |
| 2,425,077 | Alexander | Aug. 5, 1947 |

FOREIGN PATENTS

| Number | Country | Date |
| --- | --- | --- |
| 11,912 | Great Britain | 1890 |
| 4,695 | Great Britain | 1892 |